United States Patent
Jaradi et al.

(10) Patent No.: US 12,042,442 B1
(45) Date of Patent: Jul. 23, 2024

(54) SLIDABLE SEATBELT ASSEMBLY FOR WHEELCHAIR OCCUPANTS

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/180,498

(22) Filed: Mar. 8, 2023

(51) Int. Cl.
 *A61G 3/08* (2006.01)
 *B60R 22/04* (2006.01)
 *B60R 22/20* (2006.01)

(52) U.S. Cl.
 CPC ............ *A61G 3/0808* (2013.01); *B60R 22/04* (2013.01); *B60R 22/201* (2013.01)

(58) Field of Classification Search
 CPC ............................ A61G 3/0808; B60R 22/201
 See application file for complete search history.

(56) References Cited

U.S. PATENT DOCUMENTS

| | | | |
|---|---|---|---|
| 4,350,369 A | 9/1982 | Chika | |
| 4,458,919 A * | 7/1984 | Kawashima | A61G 3/02 296/68.1 |
| 10,688,959 B2 * | 6/2020 | Bryant | B60R 22/00 |
| 11,364,872 B1 * | 6/2022 | Jaradi | B60R 21/214 |
| 11,370,382 B2 * | 6/2022 | Zhao | B60R 21/23138 |
| 11,577,680 B1 * | 2/2023 | Faruque | B60N 3/002 |
| 11,590,921 B1 * | 2/2023 | Farooq | B60R 21/23138 |
| 2022/0242358 A1 * | 8/2022 | Farooq | A61G 3/0808 |

FOREIGN PATENT DOCUMENTS

| | | |
|---|---|---|
| DE | 20213310 U1 | 1/2004 |
| JP | 2002136550 A | 5/2002 |
| JP | 2007137177 A | 6/2007 |
| JP | 4068936 B2 | 3/2008 |
| JP | 7124603 B2 | 8/2022 |
| KR | 101315716 B1 | 10/2013 |
| MX | 98003518 A | 7/1999 |

OTHER PUBLICATIONS

Klinich, K, et al., "Development of an Automated Wheelchair Tiedown and Occupant Restraint System," www.umtri.mich.edu, 2021, 5 pages.

* cited by examiner

*Primary Examiner* — Faye M Fleming
(74) *Attorney, Agent, or Firm* — Frank A. MacKenzie; Bejin Bieneman PLC

(57) ABSTRACT

A vehicle includes a first post and a second post spaced cross-vehicle from the first post. The vehicle includes a vehicle roof above the first post and the second post. The vehicle includes a first track supported by the vehicle roof, a second track supported by the first post, and a third track supported by the second post. The vehicle includes a seatbelt assembly including a retractor slidably engaged with the first track, an anchor slidably engaged with the second track, and a buckle slidably engaged with the third track.

18 Claims, 12 Drawing Sheets

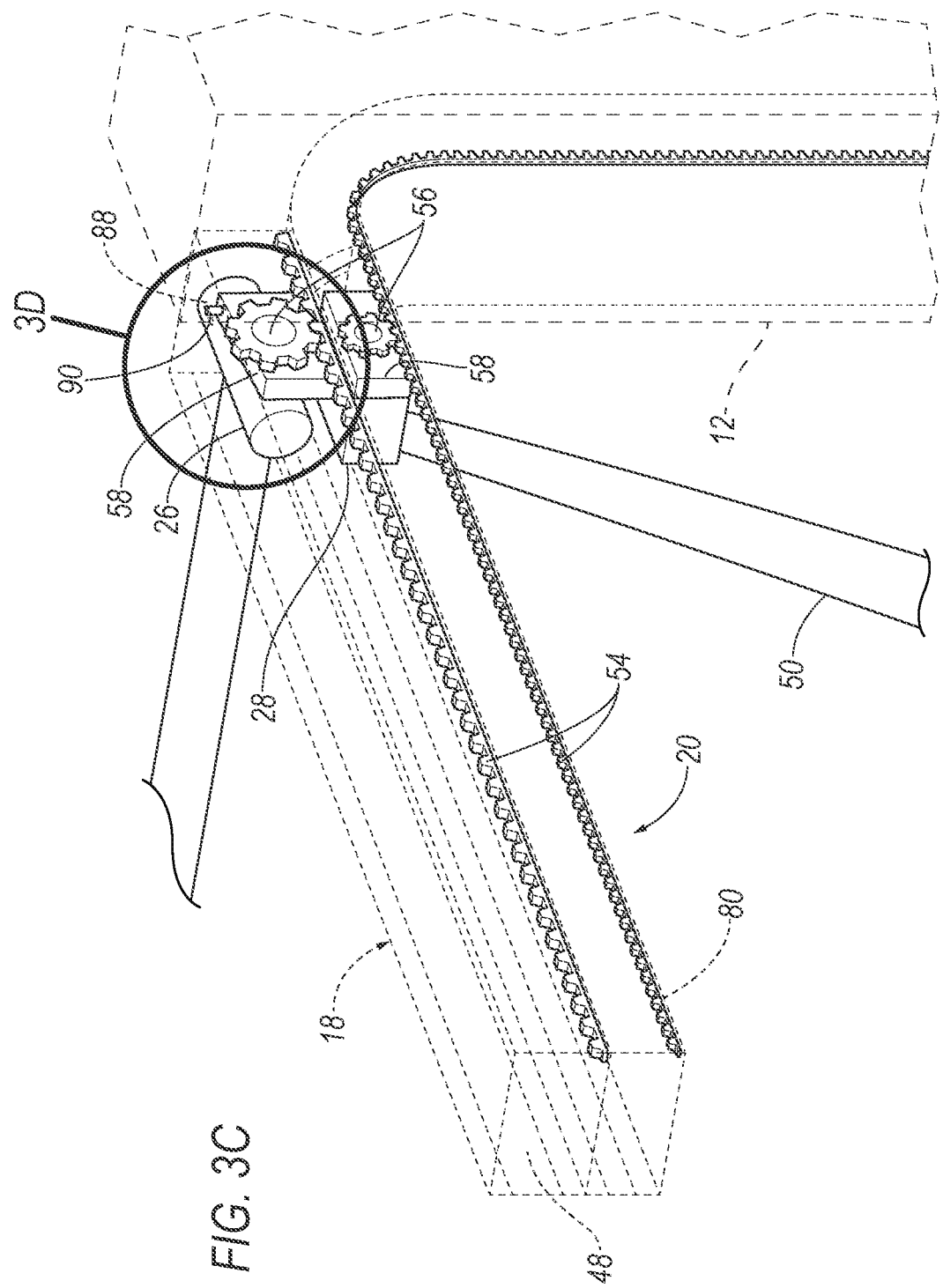

SLIDABLE SEATBELT ASSEMBLY FOR WHEELCHAIR OCCUPANTS

BACKGROUND

Accommodations for wheelchairs in vehicles are typically installed with aftermarket modifications to a production vehicle. For example, a vehicle may be modified with a lift or the like to load a wheelchair onto a vehicle. Production vehicles typically do not have the ability to accommodate the wheelchair of an occupant in a manner allowing the occupant to sit in the wheelchair in the vehicle, or if they do, significant aftermarket modification is made. For example, seatbelt systems of vehicles are not typically able to accommodate an occupant seated in a wheelchair in the vehicle.

BRIEF DESCRIPTION OF THE DRAWINGS

FIG. 3C is a perspective view of a rack and pinion to slide the seatbelt assembly along the tracks after moving along the first track and the second track.

DETAILED DESCRIPTION

Figure 1:
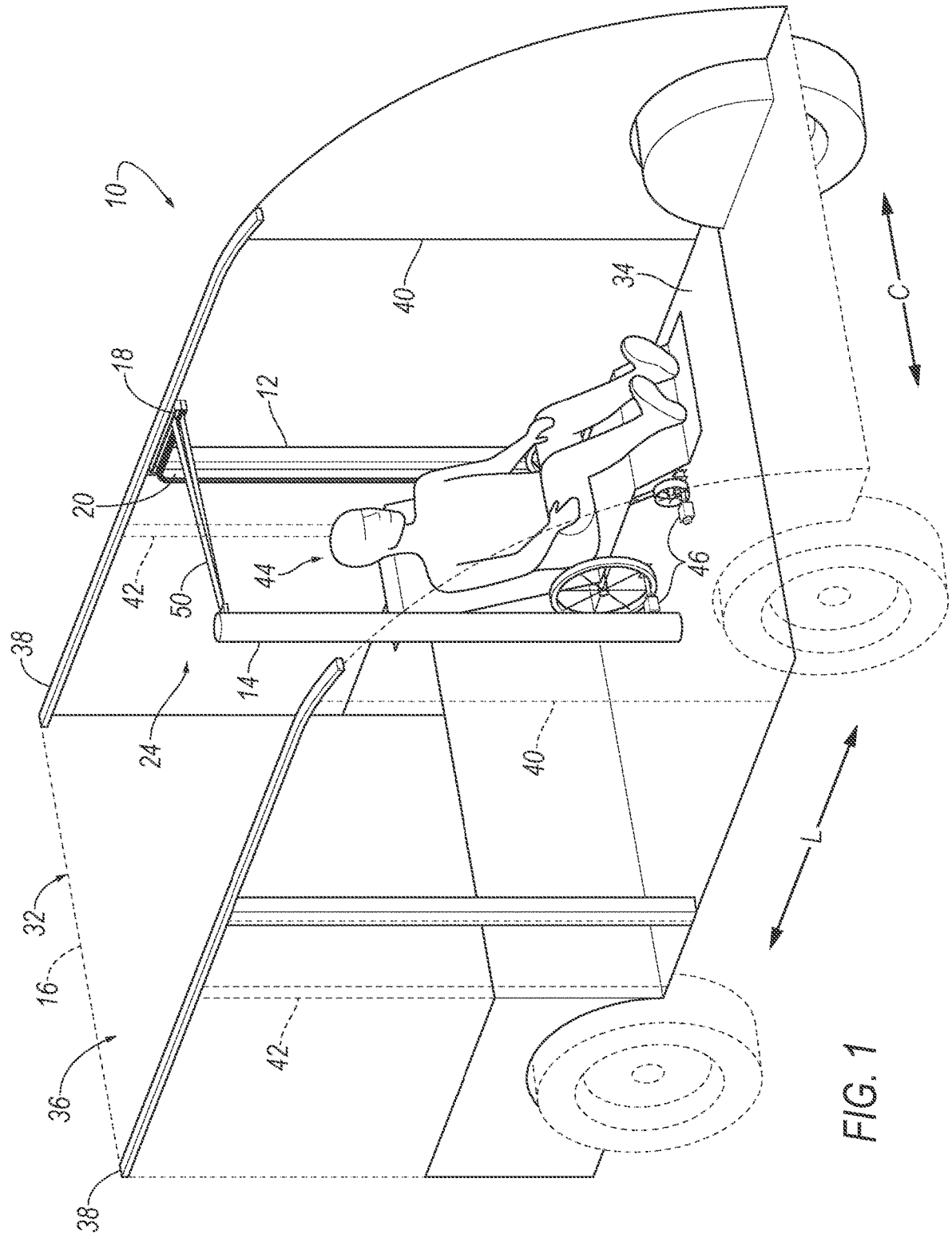
FIG. 1 is a perspective view of a vehicle having a seatbelt assembly that is slidable relative to posts of the vehicle.

A vehicle includes a first post and a second post spaced cross-vehicle from the first post. The vehicle includes a vehicle roof above the first post and the second post. The vehicle includes a first track supported by the vehicle roof, a second track supported by the first post, and a third track supported by the second post. The vehicle includes a seatbelt assembly including a retractor slidably engaged with the first track, an anchor slidably engaged with the second track, and a buckle slidably engaged with the third track.

The seatbelt assembly may include a seatbelt webbing extending from the retractor to the anchor.

The seatbelt webbing may be dividable into a lap portion extending from the retractor to the buckle and a shoulder portion extending from the buckle to the anchor.

The vehicle may include a first airbag supported by the shoulder portion and a second airbag supported by the lap portion.

The vehicle may include an airbag supported by the seatbelt webbing.

The first post may be vehicle-outboard of the second post.

The vehicle may include a wheelchair seating area between the first post and the second post.

The seatbelt assembly may include a seatbelt webbing engageable with the buckle in a belted position. The seatbelt webbing may extend from the retractor to the buckle and from the buckle to the anchor in the belted position. In the belted position, the retractor, the anchor, and the buckle may be slidable along the first track, the second track, and the third track, respectively from a first position to a second position with the seatbelt webbing extending across the wheelchair seating area in the second position.

The retractor, the anchor, and the buckle may all be in the first positions simultaneously and in the second positions simultaneously.

The wheelchair seating area may be between the buckle and the anchor.

The vehicle may include a vehicle floor spaced downwardly from the vehicle floor. The first post and the second post may each extend from the vehicle floor to the vehicle roof.

The retractor, the anchor, and the buckle may each be slidable along the first track, the second track, and the third track, respectively, from a first position to a second position, the anchor and the buckle are spaced downwardly from the retractor in the second positions.

The retractor and anchor may slide relative to the first post from the first position to the second position and the buckle slides relative to the second post from the first position to the second position.

The first track may be elongated along a vehicle-longitudinal axis and the second track includes a first portion elongated along the first post and a second portion elongated along the vehicle-longitudinal axis.

The first track and the second portion of the second track may be elongated along the vehicle roof.

The first track may extend from the first post to a distal end, the retractor being slidable between the distal end and the first post.

The vehicle may include a computer including a processor and a memory storing instructions executable by the processor to identify a wheelchair in a wheelchair seating area, slide the retractor along the first track from a first position to a second position, slide the anchor along the second track from a first position to a second position, and slide the buckle along the third track from a first position to a second position.

The vehicle may include a wheelchair seating area between the first post and the second post wherein the seatbelt assembly may include a seatbelt webbing engageable with the buckle in a belted position. The seatbelt webbing may extend from the retractor to the buckle and from the buckle to the anchor in the belted position. In the belted position, the retractor, the anchor, and the buckle may be slidable along the first track, the second track, and the third track, respectively, from a first position to a second position with the seatbelt webbing extending across the wheelchair seating area in the second position.

With reference to the Figures, wherein like numerals indicate like parts throughout the several views, a vehicle 10 includes a first post 12 and a second post 14 spaced cross-vehicle from the first post 12. The vehicle 10 includes a vehicle roof 16 above the first post 12 and the second post 14. The vehicle 10 includes a first track 18 supported by the vehicle roof 16, a second track 20 supported by the first post 12, and a third track 22 supported by the second post 14. The vehicle 10 includes a seatbelt assembly 24 including a retractor 26 slidably engaged with the first track 18, an anchor 28 slidably engaged with the second track 20, and a buckle 30 slidably engaged with the third track 22.

When a wheelchair is installed in the vehicle 10, the seatbelt assembly 24 may move to be usable by an occupant of the wheelchair. The retractor 26, the anchor 28, and the buckle 30 being slidable along tracks 18, 20, 22 allows for the wheelchair to be installed into the vehicle 10 without the seatbelt assembly 24 obstructing the ingress of the wheelchair into the vehicle 10. The sliding of the retractor 26, the anchor 28, and the buckle 30 allows for the seatbelt assembly 24 to be moved into position without the occupant needing to move the retractor 26, the anchor 28, or the buckle 30 manually.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc.

The vehicle 10 may include a vehicle body 32. The vehicle body 32 includes body panels (not numbered) partially defining an exterior of the vehicle 10. The body panels may present a class-A surface, e.g., a finished surface exposed to view by a customer and free of unaesthetic blemishes and defects. The body panels include, e.g., the vehicle roof 16, a vehicle floor 34, etc. As discussed below, the vehicle body 32 includes the vehicle roof 16 and the vehicle floor 34.

The vehicle body 32 defines a passenger compartment 36 to house occupants, if any, of the vehicle 10. The passenger compartment 36 may extend across the vehicle 10, i.e., from one side to the other side of the vehicle 10. The passenger compartment 36 includes a front end and a rear end with the front end being in front of the rear end during forward movement of the vehicle 10.

The vehicle body 32, specifically, the vehicle roof 16, includes at least two roof rails 38. The roof rails 38 are cross-vehicle spaced from each other along a cross-vehicle axis C and are generally parallel to each other in a cross-vehicle direction. The roof rails 38 each extend longitudinally along the vehicle body 32, i.e., along a vehicle-longitudinal axis L of the vehicle body 32. The vehicle body 32 may include any suitable number of roof rails 38 spaced from one another and extending longitudinally along the vehicle body 32.

The vehicle 10 includes the vehicle floor 34 defines the lower boundary of the passenger compartment 36 and may extend from the front end of the passenger compartment 36 to the rear end of the passenger compartment 36. The vehicle floor 34 may include upholstery, for example, carpet, and may have a class-A surface facing the passenger compartment 36, i.e., a surface specifically manufactured to have a high quality, finished, aesthetic appearance free of blemishes.

The vehicle roof 16 and the vehicle floor 34 are spaced from each other. Specifically, the vehicle floor 34 is spaced downwardly from the vehicle roof 16. The vehicle roof 16 defines the upper boundary of the passenger compartment 36 and may extend from the front end of the passenger compartment 36 to the rear end of the passenger compartment 36. The vehicle roof 16 may include a roof panel (not numbered) extending from one roof rail 38 to the other roof rail 38. The roof panel may be irremovably fixed to the roof rails 38. In other words, the roof panel is secured to the roof rails 38 in such a way that removal requires destruction such as cutting, e.g., cutting material and/or welded joints, etc. As an example, the roof panel may be attached to both roof rails 38, e.g., by welding, fasteners, etc.

The vehicle body 32 may include vehicle pillars 40, 42 spaced from each along the vehicle-longitudinal axis L on both sides of the vehicle body 32. Specifically, in the example shown in the Figures, the vehicle body 32 includes a front pillar 40 and a rear pillar 42 spaced vehicle-rearward from the front pillar 40. The vehicle 10 includes a set of vehicle pillars 40, 42 on each side of the vehicle body 32. For example, the vehicle body 32 includes a front pillar 40 and a rear pillar 42 on each side of the vehicle 10 with the vehicle pillars 40, 42 being spaced from each other along the vehicle-longitudinal axis L. In other words, the front pillar 40 may be disposed at the front end of the passenger compartment 36, the rear pillar 42 may be disposed at the rear end of the passenger compartment 36. The vehicle pillars 40, 42, on both sides of the vehicle 10, may extend from the vehicle roof 16 to the vehicle floor 34 to support the vehicle roof 16. The vehicle 10 may include other vehicle pillars 40, 42 in addition to the front pillar 40 and the rear pillar 42.

With reference to FIGS. 2A, 3A, 4, and 5, the vehicle 10 includes the first post 12 and the second post 14 each extending from the vehicle roof 16 to the vehicle floor 34. In other words, the vehicle roof 16 is above the first post 12 and the second post 14 and the vehicle floor 34 is below the first post 12 and the second post 14. The first post 12 is between the front pillar 40 and the rear pillar 42. The first post 12 may be a middle pillar between the front pillar 40 and the rear pillar 42. Specifically, the first post 12 may be vehicle-rearward of the front pillar 40 and vehicle-forward of the rear pillar 42.

The first post 12 and the second post 14 are spaced cross-vehicle from the first post 12. The first post 12 is vehicle-outboard of the second post 14. The first post 12 and the second post 14 are aligned with each other along the cross-vehicle axis C. The second post 14 may be in a position aligned with the first post 12 between the front end and the rear end of the passenger compartment 36.

The passenger compartment 36 defines a wheelchair seating area 44. The wheelchair seating area 44 is the area occupied by a wheelchair and occupant of the wheelchair when properly seated in the vehicle 10. In the example shown in the Figures, the wheelchair seating area 44 faces the front end of the passenger compartment 36 when the wheelchair is installed in the vehicle 10. The wheelchair seating area 44 is between the first post 12 and the second post 14. In other words, the first post 12 is on one side of the wheelchair seating area 44 and the second post 14 is on the opposite side of the wheelchair seating area 44.

The vehicle 10 may include a plurality of latches 46 supported by the vehicle floor 34. The latches 46 may engage wheels of the wheelchair to lock the wheels of the wheelchair relative to the vehicle floor 34, including along the vehicle-longitudinal axis L. The latches 46 may be anchored to the vehicle floor 34 and may retractably extend through the wheels of the wheelchair. The vehicle 10 may include any suitable number of latches 46 for the number of wheelchairs that may be accommodated by the vehicle 10. The latches 46 may be any suitable type of latches 46. For example, the latches 46 may be of the type that are manually operated by an occupant of the wheelchairs. In other examples, the latches 46 may be of the type that are electronically operated, e.g., solenoid, to latch 46 the wheels of the wheelchair, e.g., through a human-machine interface such as a button, switch, touch-screen, etc.

With continued reference to FIGS. 2A, 3A, 4, and 5, the vehicle 10 includes the first track 18, the second track 20, and the third track 22. The first track 18 is supported by the vehicle roof 16. For example, the first track 18 may be supported by one of the roof rails 38. Specifically, the first track 18 is fixed to the vehicle roof 16, e.g., fixed to one of the roof rails 38. The first track 18 is elongated along the vehicle roof 16. The first track 18 is elongated along the vehicle-longitudinal axis L. The first track 18 is supported adjacent the first post 12. Specifically, the first track 18 is elongated from the first post 12 to a distal end 48. The distal end 48 is spaced from the first post 12. In the example in the Figures, the distal end 48 is spaced vehicle-forward along the vehicle-longitudinal axis L. In other examples, the distal end 48 may be spaced vehicle-rearward along the vehicle-longitudinal axis L.

The second track 20 is supported by the first post 12. Specifically, the second track 20 is fixed to first post 12. The second track 20 includes a first portion 78 and a second portion 80. The first portion 78 is elongated along the first post 12 and the second portion 80 elongated along the vehicle-longitudinal axis L. Specifically, the first portion 78 extends from the vehicle roof 16 to the vehicle floor 34 along the first post 12 and the second portion 80 is elongated along the vehicle roof 16.

The third track 22 supported by the second post 14. Specifically, the third track 22 is fixed to the second post 14. The third track 22 extends from the vehicle roof 16 to the vehicle floor 34. In other words, the third track 22 is elongated along the second post 14.

The seatbelt assembly 24 may include the retractor 26 and a seatbelt webbing 50 retractably payable from the retractor 26. The seatbelt assembly 24 may include the anchor 28 coupled to the seatbelt webbing 50 and may include a clip 52 that engages the buckle 30. In other words, the seatbelt webbing 50 is engageable with the buckle 30. The clip 52 may be movable from an unbelted position to a belted position. In other words, the clip 52 may be engaged with the buckle 30 in the belted position and the clip 52 may be disengaged with the buckle 30 in the unbelted position. The seatbelt assembly 24 may control the kinematics of the occupant of the wheelchair, e.g., during sudden decelerations of the vehicle 10. The seatbelt webbing 50 may extend continuously from the retractor 26 to the anchor 28. For example, one end of the seatbelt webbing 50 feeds into the retractor 26, and the other end of the seatbelt webbing 50 is fixed to the anchor 28. The seatbelt webbing 50 may be fabric, e.g., woven polyester. The seatbelt webbing 50 is dividable into a lap portion 82 and a shoulder portion 84. Specifically, the clip 52 divides the seatbelt webbing 50 into the lap portion 82 and the shoulder portion 84 and the clip 52 may move freely along the seatbelt webbing 50. The lap portion 82 extends from the retractor 26 to the buckle 30 and the shoulder portion 84 extends from the buckle 30 to the anchor 28.

With reference to FIGS. 2-5, the seatbelt assembly 24 is movable along the first track 18, the second track 20, and the third track 22 from a raised position to a lowered position. Specifically, the seatbelt assembly 24 is slidable along the first track 18, the second track 20, and the third track 22. The seatbelt assembly 24 is slidable along the first track 18, the second track 20, and the third track 22 when the clip 52 is in the belted position. In other words, the seatbelt assembly 24 does not move to the lowered position when the clip 52 is in the unbelted position. In the belted position, the seatbelt webbing 50 extends from the retractor 26 to the buckle 30 and from the buckle 30 to the anchor 28.

The retractor 26 of the seatbelt assembly 24 is supported by the first track 18. Specifically, the retractor 26 is slidably engaged with the first track 18. In other words, the retractor 26 slides along the first track 18 from a first position to a second position. The retractor 26 slides along the first track 18 between the distal end 48 and the first post 12. The retractor 26 may slide from the first position and toward the first post 12 to the second position. The retractor 26 is in the first position when the seatbelt assembly 24 is in the raised position and the retractor 26 is in the second position when the seatbelt assembly 24 is in the lowered position.

The anchor 28 of the seatbelt assembly 24 is supported by the second track 20. Specifically, the anchor 28 is slidably engaged with the second track 20. In other words, the anchor 28 slides along the second track 20 from a first position to a second position. The anchor 28 slides along both portions of the second track 20 to the second position. Specifically, the anchor 28 slides along the second portion 80 of the second track 20 toward the first post 12 and the anchor 28 slides along the first portion 78 of the second track 20 to reach the second position. In other words, the anchor 28 slide along the roof, i.e., along the second portion 80, and along the first post 12, i.e., the first portion 78, to the second position. The anchor 28 is in the first position when the seatbelt assembly 24 is in the raised position and the anchor 28 is in the second position when the seatbelt assembly 24 is in the lowered position.

Figure 4:
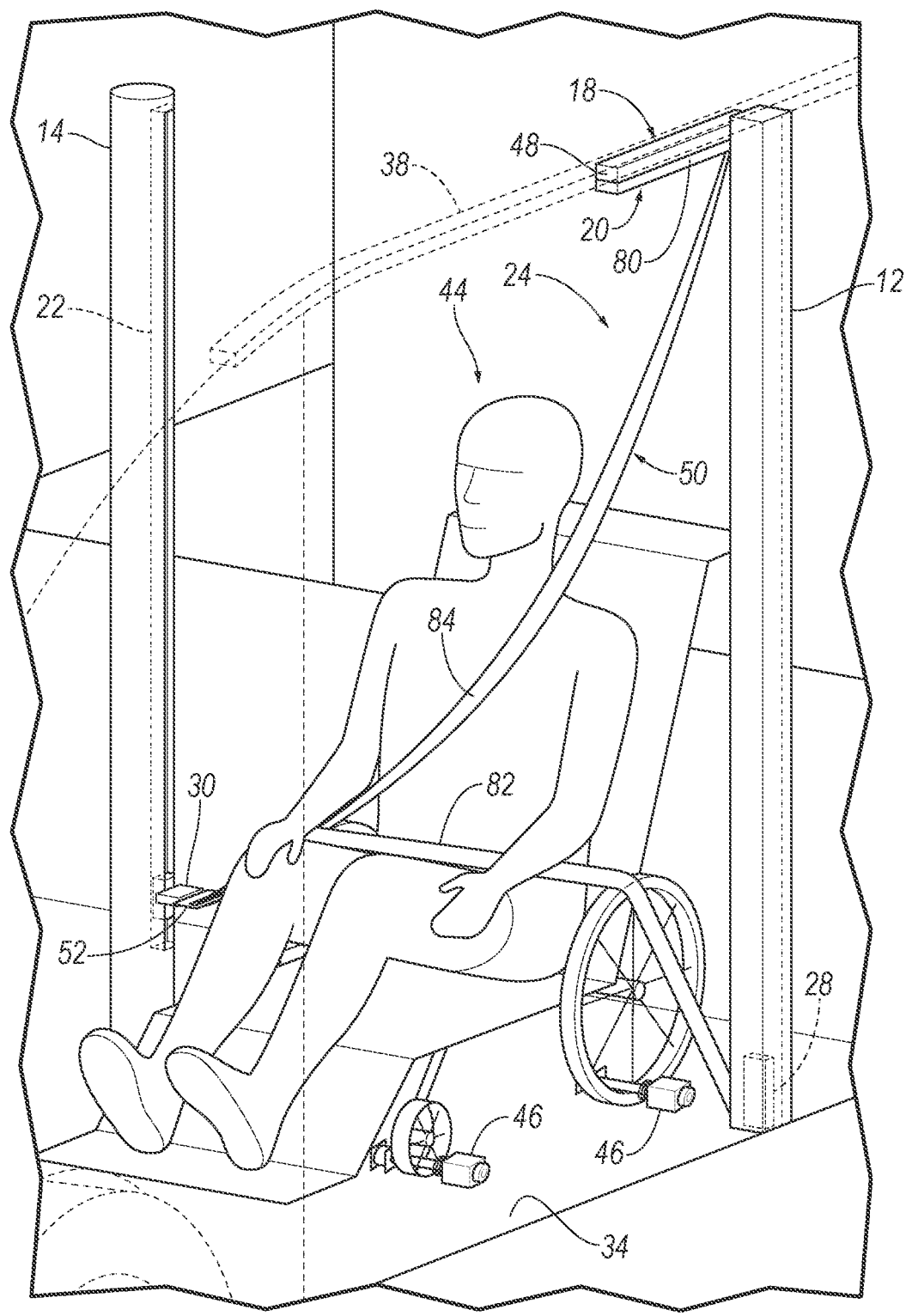
FIG. 4 is a second perspective view of the seatbelt assembly in the lowered position.
Figure 5:
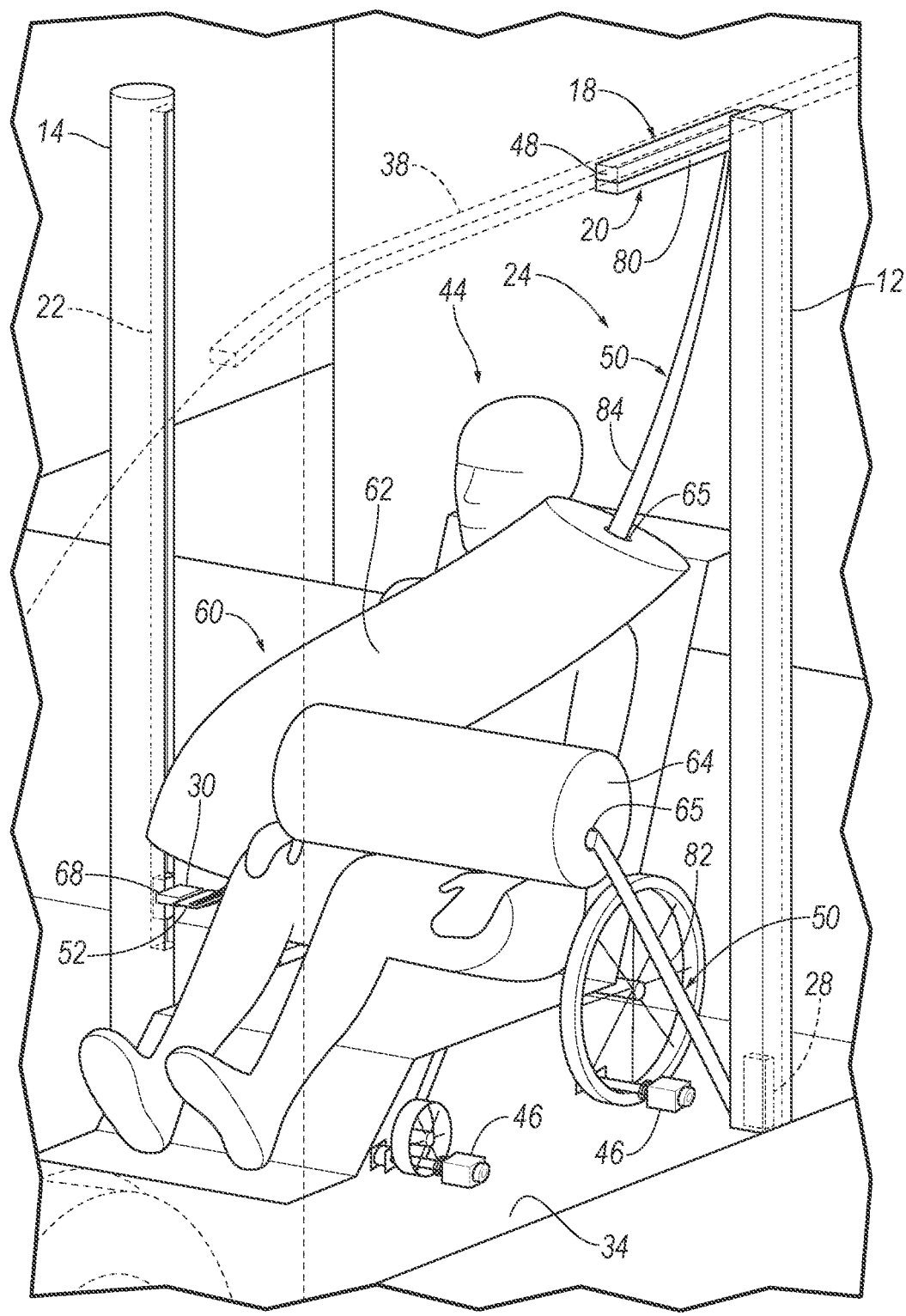
FIG. 5 is a perspective view with a first airbag and a second airbag in inflated positions.

With reference to FIGS. 4 and 5, the buckle 30 of the seatbelt assembly 24 is supported by the third track 22. Specifically, the buckle 30 is slidably engaged with the third track 22. In other words, the buckle 30 slides along the third track 22 from a first position to a second position. The first position may be adjacent the vehicle roof 16 and the second position may be adjacent the vehicle floor 34. In other words, the buckle 30 may slide away from the vehicle roof 16 and toward the vehicle floor 34 from the first position to the second position. The buckle 30 is in the first position when the seatbelt assembly 24 is in the raised position and the buckle 30 is in the second position when the seatbelt assembly 24 is in the lowered position.

The wheelchair seating area 44 is between the buckle 30 and the anchor 28 in both the first positions and the second positions. The retractor 26, the anchor 28, and the buckle 30 are in the first positions and the second positions simultaneously. In other words, the retractor 26, the anchor 28, and the buckle 30 are in the first positions and the second positions at the same time. The anchor 28 and the buckle 30 are spaced downwardly from the retractor 26 in the second positions.

When the seatbelt assembly 24 is in the raised position, the seatbelt webbing 50 extends cross-vehicle from the first track 18 to the third track 22 and from the third track 22 to the second track 20. Specifically, the seatbelt webbing 50 is adjacent the vehicle roof 16 and extends cross-vehicle from the first track 18 to the third track 22 and from the third track 22 to the second track 20. In other words, the seatbelt webbing 50 may be above the head of the occupant of the wheelchair. As the seatbelt assembly 24 moves to the lowered position, the seatbelt webbing 50 moves away from the roof and toward the wheelchair in the wheelchair seating area 44. The seatbelt webbing 50 moves into the lowered position over the occupant to control the kinematics of the occupant in the wheelchair. In the belted position and as the seatbelt assembly 24 moves to the lowered position, the retractor 26, the anchor 28, and the buckle 30 slide along the first track 18, the second track 20, and the third track 22, respectively from the first positions to the second positions with the seatbelt webbing 50 extending across the wheelchair seating area 44 in the second position. In the lowered position, the lap portion 82 of the seatbelt webbing 50 may extend across the lap of the occupant of wheelchair and the shoulder portion 84 may extend across the torso and shoulders of the occupant of the wheelchair.

Figure 2A:
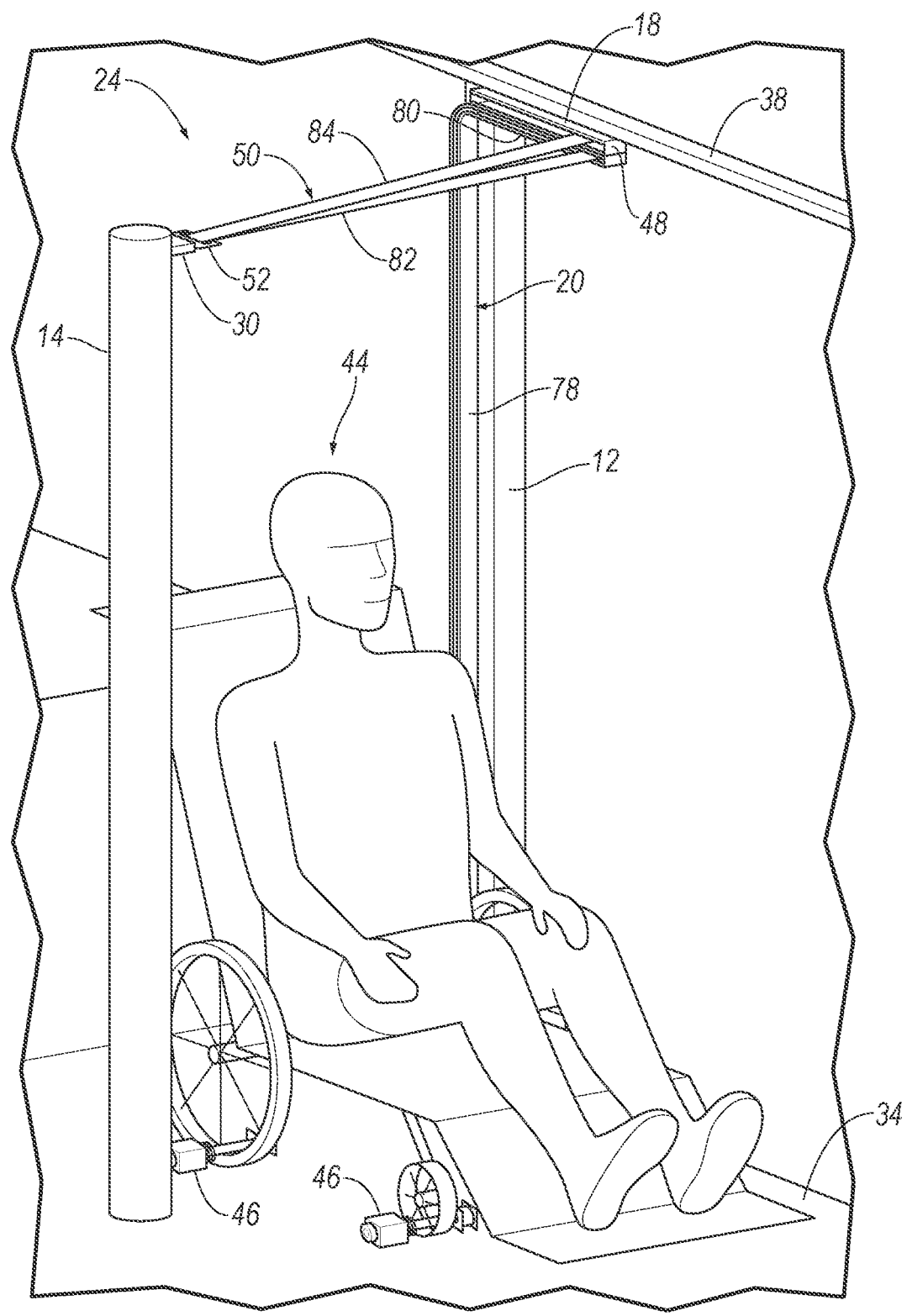
FIG. 2A is a perspective view of the seatbelt assembly in a raised position.
Figure 2B:
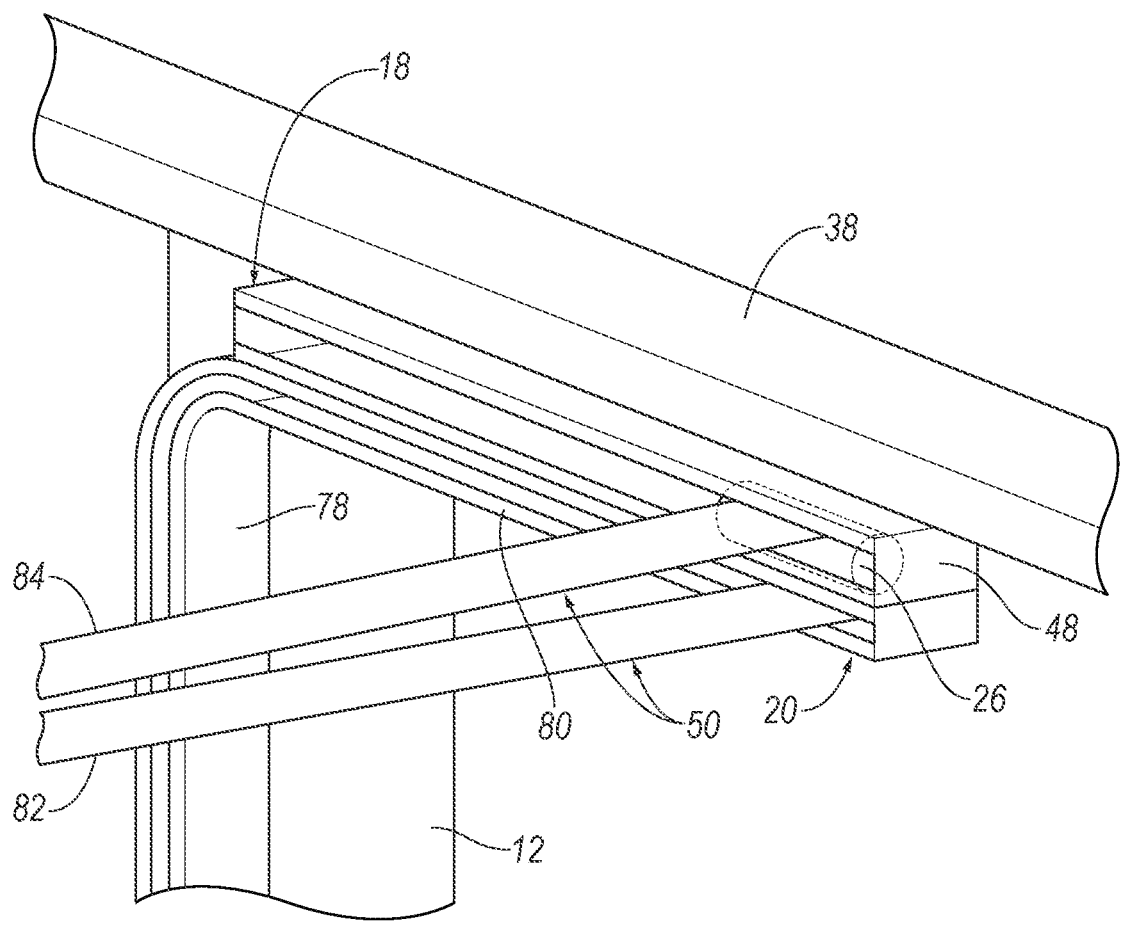
FIG. 2B is a perspective view of a first track and a second track of the vehicle.
Figure 2C:
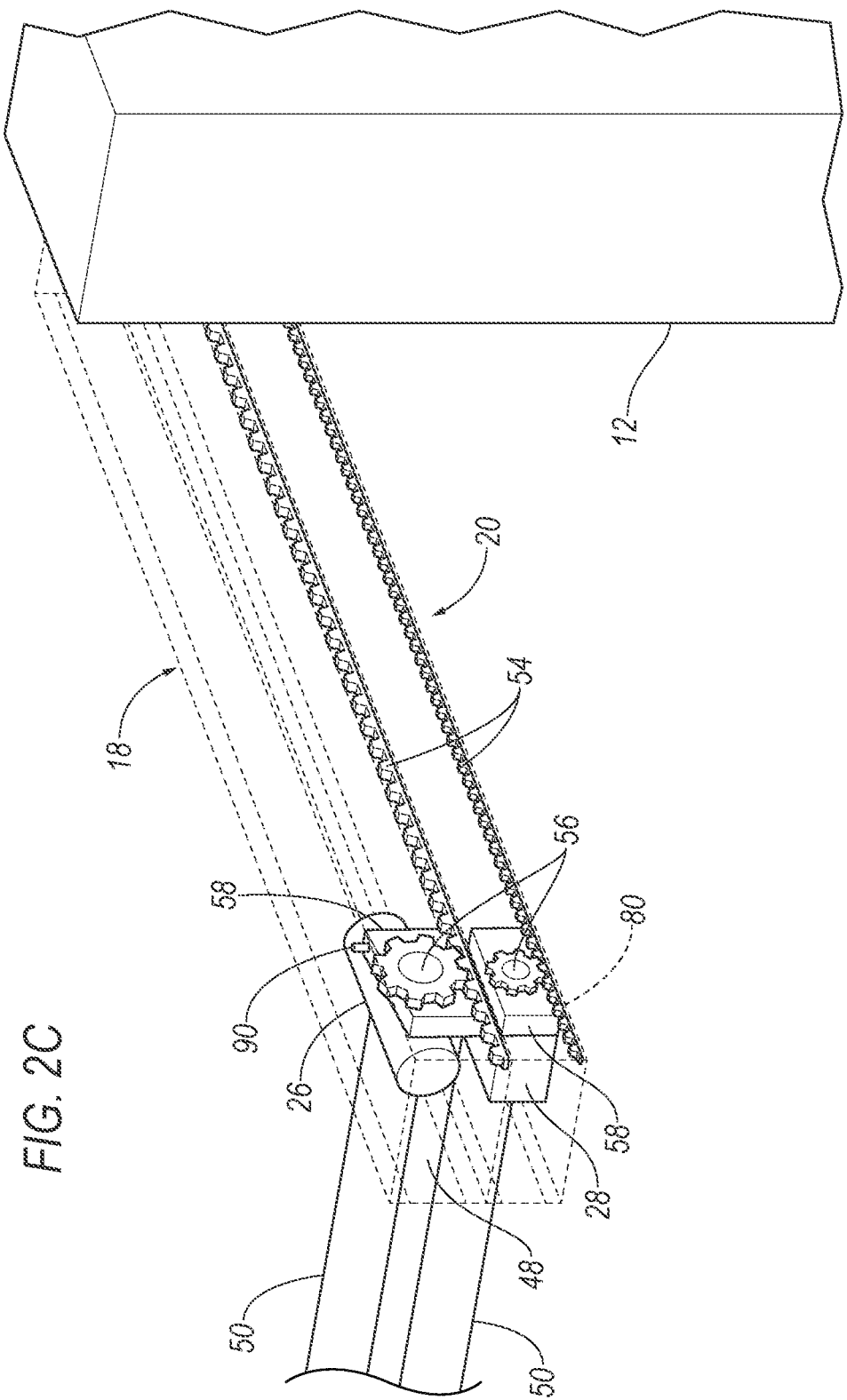
FIG. 2C is a perspective view of a rack and pinion to slide the seatbelt assembly along the tracks in a first position.

With reference to FIGS. 2C and 3C, the retractor 26, the anchor 28, and the buckle 30 may be slidable along the tracks 18, 20, 22 in any suitable way. For example, a motor 58 may be operatively coupled to the pinion 56 to rotate the pinion 56 relative to the rack 54. In the example shown in the Figures, the tracks 18, 20, 22 may include a rack 54 and a pinion 56 engaged with the rack 54. The rack 54 may extend a length of each of the tracks 18, 20, 22 and the pinion 56 may be rotatable relative to the rack 54 to move the retractor 26, the anchor 28, and the buckle 30 along the tracks 18, 20, 22. As the pinion 56 rotates, the retractor 26, the anchor 28, and the buckle 30 along the tracks 18, 20, 22 from the first positions to the second positions. Once the retractor 26, the anchor 28, and the buckle 30 reach the second positions, the motor 58 locks the retractor 26, the anchor 28, and the buckle 30 in the second positions. As the pinion 56 rotates, the retractor 26, the anchor 28, and the buckle 30 slide along the tracks 18, 20, 22. In other examples, the tracks 18, 20, 22 may include other types of linear actuators, e.g., a worm gear, etc., to move the retractor 26, the anchor 28, and the buckle 30 along the tracks 18, 20, 22.

Figure 3A:
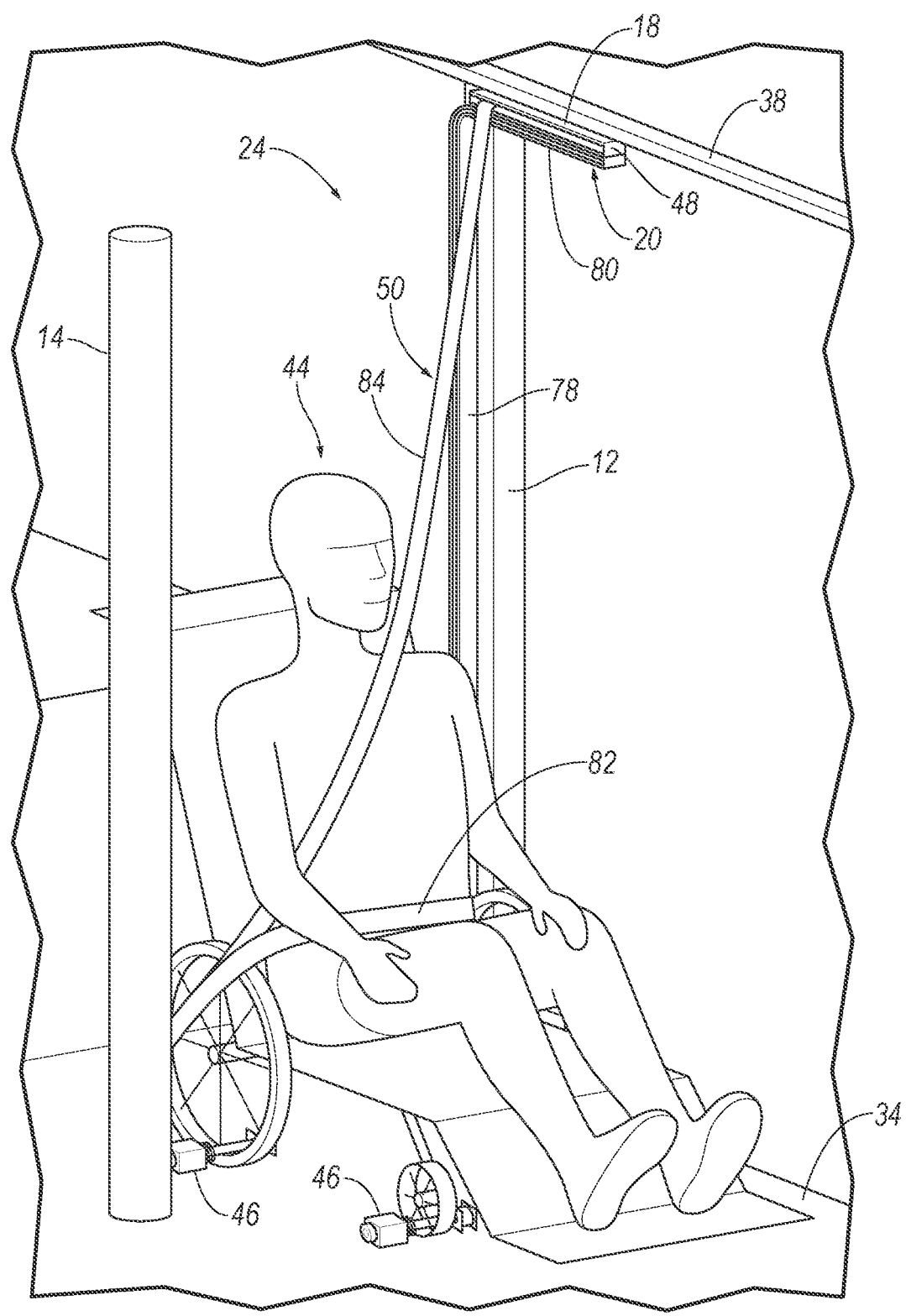
FIG. 3A is a perspective view of the seatbelt assembly in a lowered position.
Figure 3B:
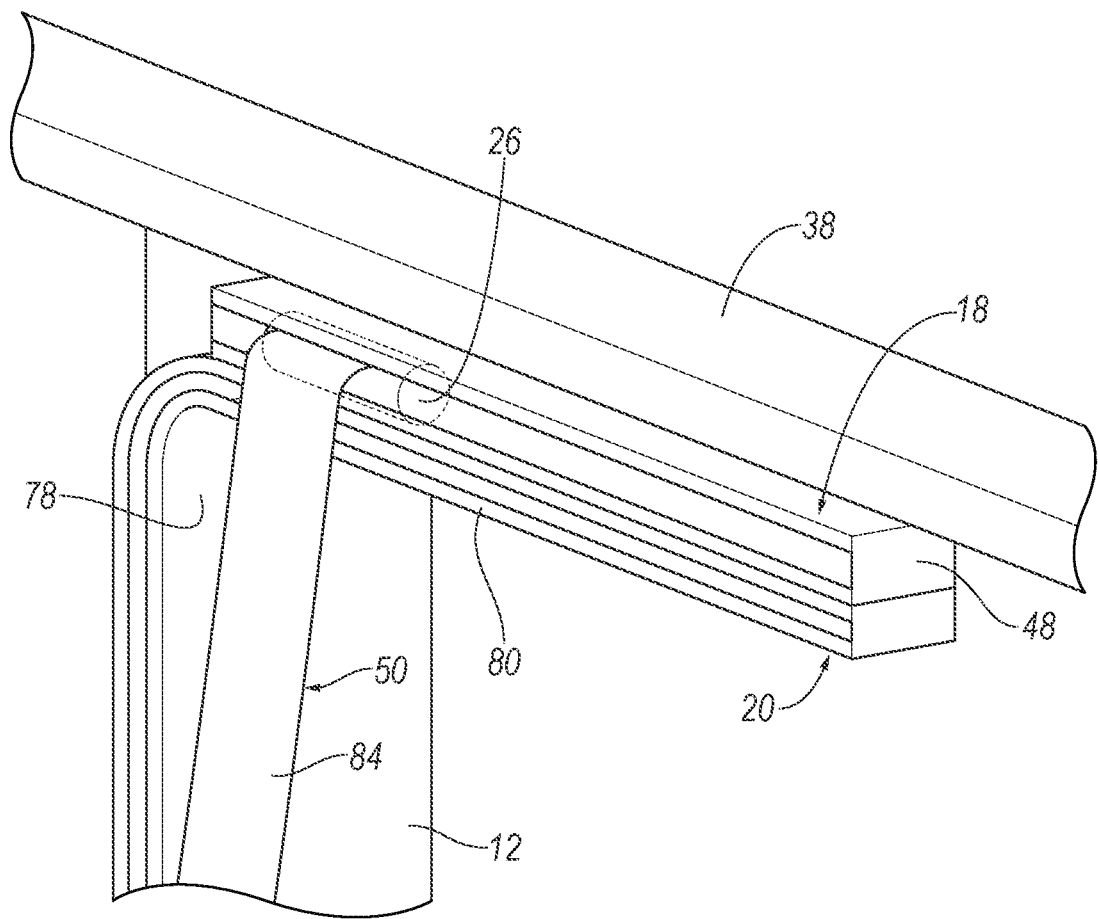
FIG. 3B is a perspective view of the first track and the second track of the vehicle.
Figure 3D:
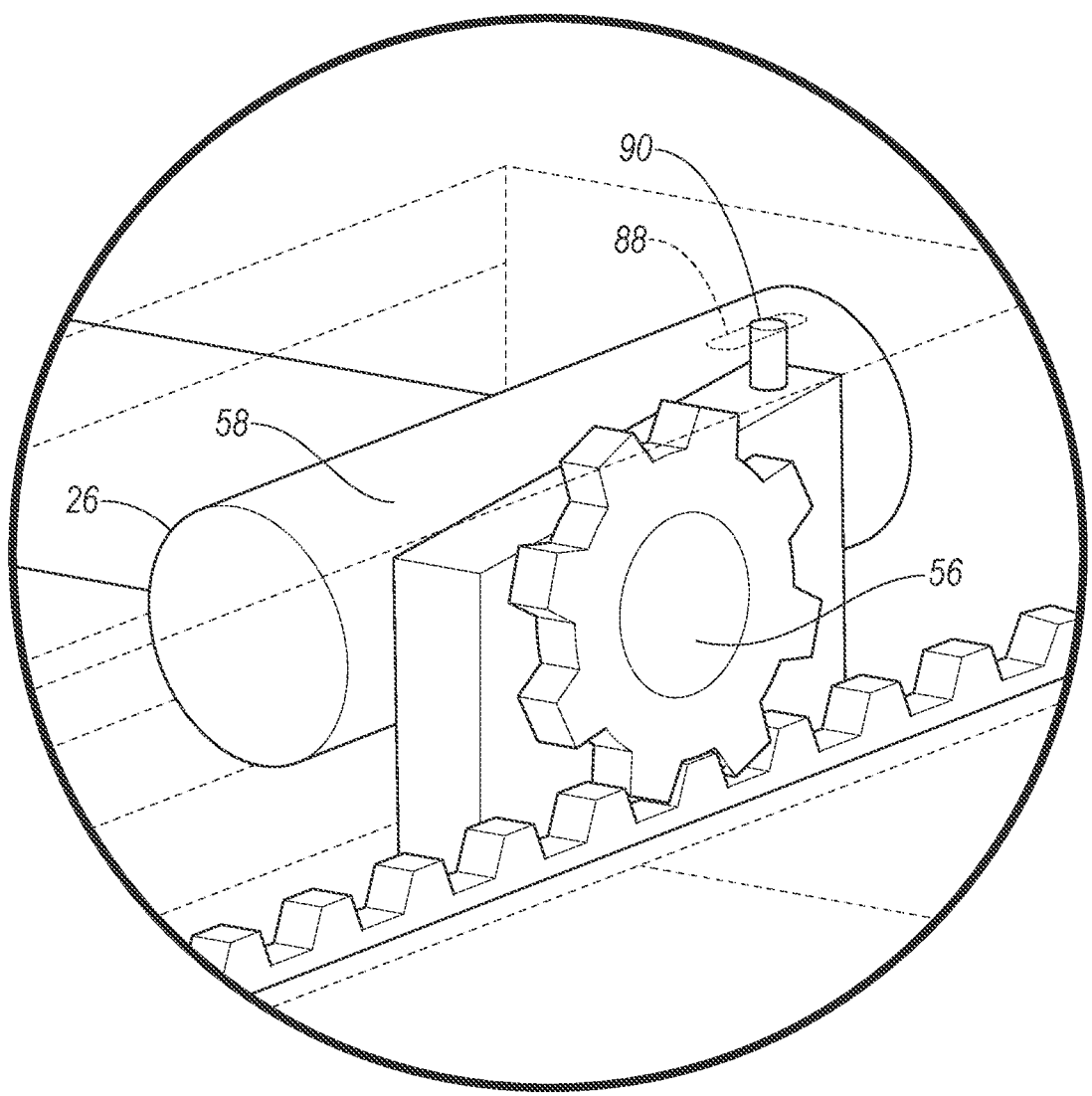
FIG. 3D is a perspective view of a lock between the seatbelt assembly and the first track.

With reference to FIG. 3D, the retractor 26 may be lockable relative to the first track 18 in the event of certain vehicle impacts. In other words, in the event of certain vehicle impacts, the retractor 26 may be maintained in the second position the first track 18 such that the seatbelt assembly 24 may control the kinematics of the occupant of the wheelchair. The retractor 26 may be lockable relative to the first track 18 in any suitable way. For example, as shown in the Figures, the first track 18 may define a slot 88 and a peg 90 supported relative to the retractor 26. In the event of certain vehicle impacts, the retractor 26 may rotate relative to the first track 18. As the retractor 26 rotates, the slot 88 may receive the peg 90 to maintain the position of the retractor 26 along the first track 18. In other examples, other or different components may lock the retractor 26 relative to the first track 18 in the event of certain vehicle impacts, e.g., teeth, electronic locking components, etc.

The anchor 28 and the buckle 30 may be lockable relative to the second track 20 and the third track 22 in the second positions in the event of certain vehicle impacts. In other words, the anchor 28 may be lockable relative to the second track 20 and the buckle 30 may be lockable relative to the third track 22 in the event of certain vehicle impacts. Similar or the same components as described above relative to the retractor 26 and the first track 18, e.g., a slot and peg, may be between the anchor 28 and the second track 20 and between the buckle 30 and the third track 22 to lock the anchor 28 and the buckle 30 in the second positions.

The retractor 26 may be moveable from an unlocked position to a locked position by conventional mechanisms known in the art. In the unlocked position, the seatbelt webbing 50 may be extended from and retracted into the retractor 26. In the locked position, the retractor 26 prevents extension of the seatbelt webbing 50 to limit the forward movement of the occupant. The retractor 26 may be in the unlocked position by default, i.e., in the absence of a sudden deceleration. The retractor 26 may change from the unlocked position to the locked position during a sudden deceleration of the vehicle 10, i.e., deceleration triggers components of the retractor 26 to change from the unlocked position to the locked position. The retractor 26 may include a torsion bar not shown. The torsion bar may be of the conventional type known in the art. The torsion bar may rotate freely in the unlocked position. In the locked position, one end of the torsion bar may be fixed to prevent rotation of the torsion bar, i.e., payout of the seatbelt webbing 50. The torsion bar may be designed to rotationally yield, that is, plastically deform, as the torsion bar is rotated by the seatbelt webbing 50, i.e., by the force exerted on the seatbelt webbing 50 by the occupant. In particular, the torsion bar may be formed of suitable shape, dimension, and material to yield when subjected to a threshold rotational force. For example, when the retractor 26 is in the locked position but the seatbelt webbing 50 exerts a force not shown on the retractor 26, the torsion bar may prevent the seatbelt webbing 50 from paying out unless the force by the seatbelt webbing 50 exceeds a threshold, in which case the rotational yielding may permit the seatbelt webbing 50 to payout.

The vehicle 10 may include any suitable number of seatbelt assemblies 24. For example, other wheelchair seating areas 44 of the vehicle 10 may be adjacent other seatbelt assemblies 24. Specifically, for example, the vehicle 10 may include a wheelchair seating area 44 spaced cross-vehicle from the wheelchair seating area 44 shown in the Figures, e.g., on the opposite side of the second post 14. In such an example, a second seatbelt assembly 24 and set of tracks 18, 20, 22 may be adjacent such a wheelchair seating area 44. The buckle 30 of the second seatbelt assembly 24 may also be supported by the second post 14, i.e., a third track 22 supported by the second post 14. The same motor 58 may be used to move the buckles 30 from both seatbelt assemblies 24 supported by the second post 14.

With reference to FIG. 5, the seatbelt assembly 24 may include an airbag assembly 60. The airbag assembly 60 may include a first airbag 62, a second airbag 64, and an inflator 68. The vehicle 10 may include any suitable number of airbag assemblies 60. As one example, each of the seatbelt assemblies 24 of the vehicle 10 may include one airbag assembly 60. In examples including more than one airbag assembly 60, the airbag assemblies 60 may be identical or substantially identical to each other.

The airbags 62, 64 are supported by the seatbelt webbing 50 of the seatbelt assembly 24. The airbags 62, 64 may be located at different positions along the seatbelt assembly 24. For example, the first airbag 62 may be supported by the shoulder portion 84 of the seatbelt webbing 50 and the second airbag 64 may be supported by the lap portion 82 of the seatbelt webbing 50. The airbags 62, 64 may surround the seatbelt webbing 50. In other words, the airbags 62, 64 may define bores 66 that are elongated along the airbags 62, 64 through which the seatbelt webbing 50 extends. In the event of certain vehicle impacts, the first airbag 62 and the second airbag 64 may inflate from uninflated positions to inflated positions to control the kinematics of the occupant of the wheelchair.

The seatbelt assembly 24 may include one or more inflators 68 that are fluidly connected to the first airbag 62 and the second airbag 64. The inflator 68 expands the first airbag 62 and the second airbag 64 with inflation medium, such as a gas, to move the airbag from the uninflated position to the inflated position. The inflator 68 may be, for example, a pyrotechnic inflator that ignites a chemical reaction to generate the inflation medium, a stored gas inflator that releases (e.g., by a pyrotechnic valve) stored gas as the inflation medium, or a hybrid. In examples including one inflator 68, the airbag assembly 60 may include on fill tube that is routed to each of the first airbag 62 and the second airbag 64. In examples including more than one inflator 68, e.g., one inflator 68 per airbag, each of the first airbag 62 and the second airbag 64 may have one inflator 68 connected by separate fill tubes.

The first airbag 62 and the second airbag 64 may be fabric, e.g., a woven polymer. As an example, the first airbag 62 and the second airbag 64 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

Figure 6:
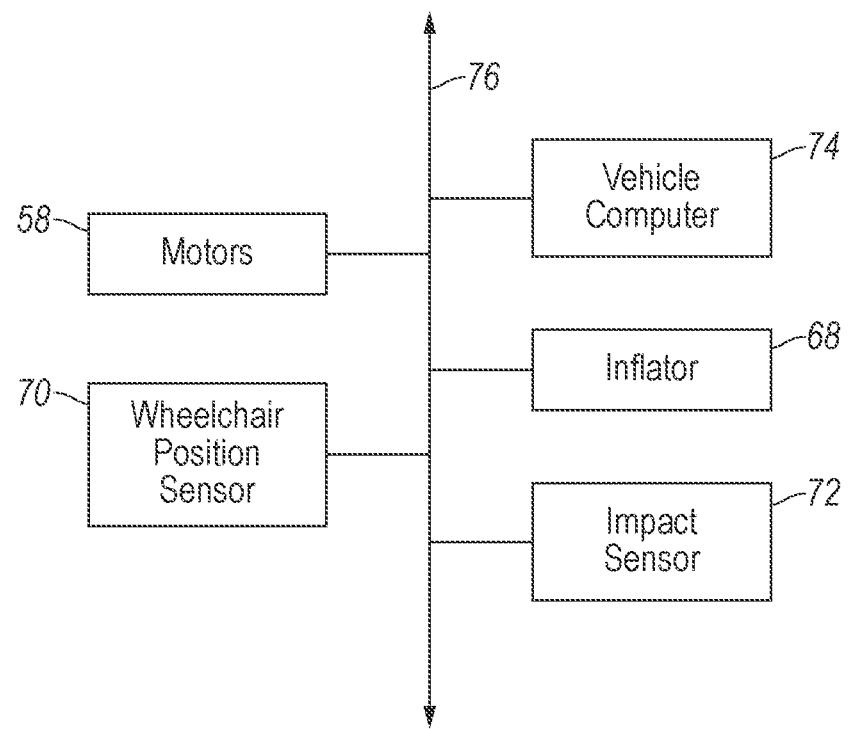
FIG. 6 is a block diagram of a vehicle communication network of the vehicle.

With reference to FIG. 6, the vehicle 10 may include wheelchair position sensors 70 to identify the presence and a position of a wheelchair in the vehicle 10. The wheelchair position sensors 70 may be in communication with a vehicle computer 74 of the vehicle 10. The wheelchair position sensors 70 may send a signal to the vehicle computer 74 to indicate that a wheelchair is present in the vehicle 10 and the position of the wheelchair along the vehicle-longitudinal axis L. The wheelchair position sensors 70 may be any suitable type of sensors, e.g., weight sensors, cameras, etc.

The vehicle 10 may include at least one impact sensor 72 for sensing certain vehicle impacts, and the vehicle computer 74 in communication with the impact sensor 72 and the inflators 68. The vehicle computer 74 may activate the inflator 68, e.g., provide an impulse to a pyrotechnic charge of the inflators 68 when the impact sensor 72 senses certain vehicle impacts. Alternatively or additionally to sensing certain vehicle impacts, the impact sensor 72 may be configured to sense certain vehicle impacts prior to impact, i.e., pre-impact sensing. The impact sensor 72 may be in communication with the vehicle computer 74. The impact sensor 72 is configured to detect a certain impacts. The impact sensor 72 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 72 may be located at numerous points in or on the vehicle 10.

With continued reference to FIG. 6, the vehicle computer 74 includes a processor and a memory storing instructions executable by the processor. The memory includes one or more forms of computer readable media, and stores instructions executable by the vehicle computer 74 for performing various operations, including as disclosed herein. The vehicle computer 74 may be a restraints control module. The vehicle computer 74 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 74 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 74.

The vehicle computer 74 is generally arranged for communications on a vehicle communication network 76 that can include a bus in the vehicle 10 such as a controller area network CAN or the like, and/or other wired and/or wireless mechanisms. Alternatively or additionally, in cases where the vehicle computer 74 actually comprises a plurality of devices, the vehicle communication network 76 may be used for communications between devices represented as the vehicle computer 74 in this disclosure. Further, as mentioned below, various controllers and/or sensors may provide data to the vehicle computer 74 via the vehicle communication network 76.

Figure 7:
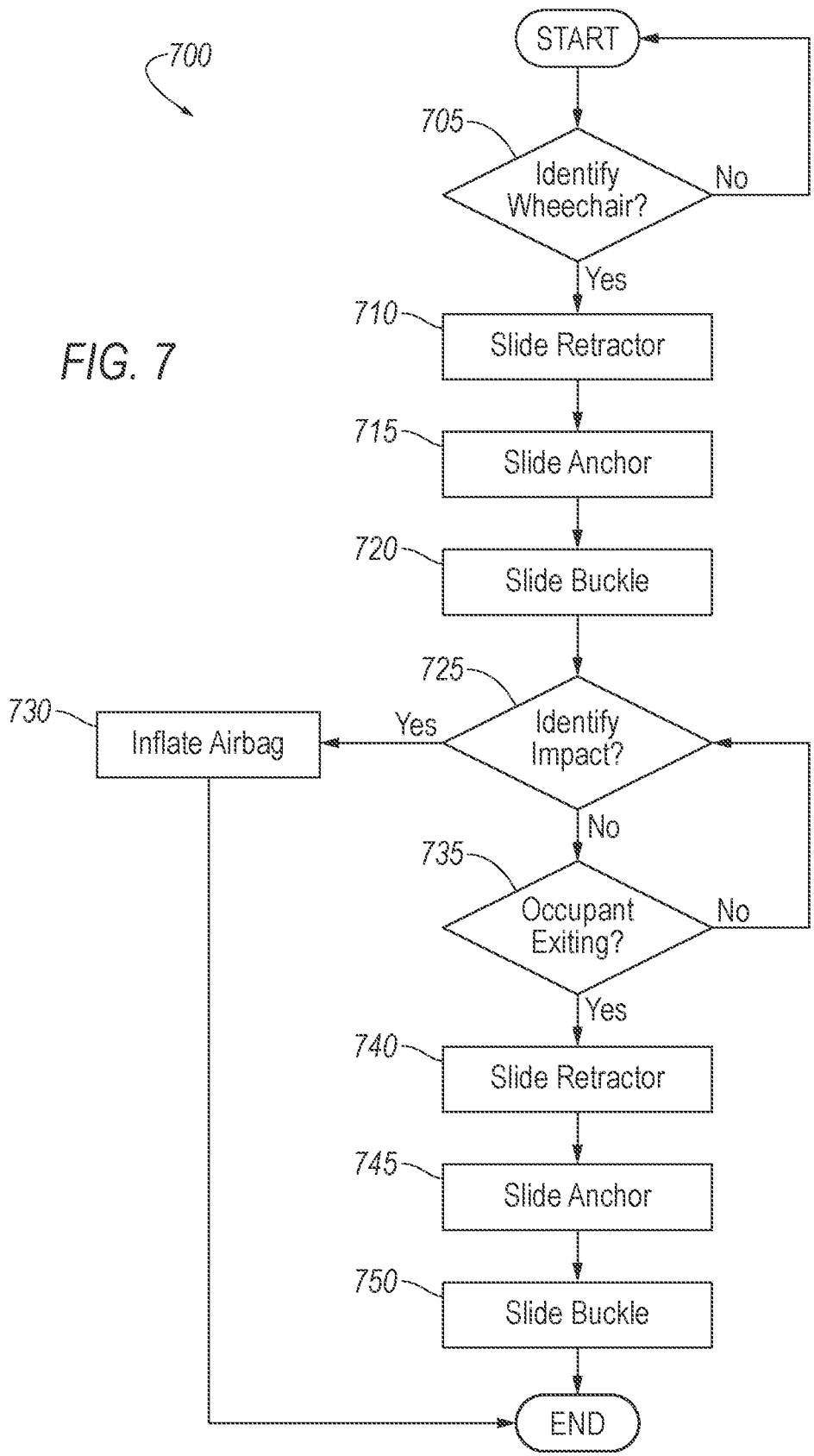
FIG. 7 is a flowchart of a method executable by a vehicle computer.

With reference to FIG. 7, the vehicle computer 74 stores instructions to control components of the vehicle 10 according to the method 700. Specifically, as shown in FIG. 7, the method 700 includes moving the seatbelt assembly 24 to the lowered position around an occupant of a wheelchair. Any use of "based on" herein, including with reference to method 700, indicates a causal relationship, not merely a temporal relationship.

With reference to decision block 705, the method 700 includes identifying a wheelchair is in the wheelchair seating area 44 of the vehicle 10. The wheelchair position sensors 70 indicate to the vehicle computer 74 whether a wheelchair has been installed into the wheelchair seating area 44. If no wheelchair is identified, the method 700 returns to its start. If a wheelchair is identified, the method 700 moves to block 710.

With reference to block 710, based on identification of a wheelchair in the wheelchair seating area 44, the method 700 includes sliding the retractor 26 along the first track 18 from the first position to the second position. The vehicle computer 74 may send a signal to the motor 58 associated with the retractor 26 to slide the retractor 26 from the first position to the second position.

With reference to block 715, the method 700 includes sliding the anchor 28 along the second track 20 from the first position to the second position. The vehicle computer 74 may send a signal to the motor 58 associated with the anchor 28 to slide the anchor 28 to the second position. The anchor 28 slides along the second portion 80 of the second track 20 and the first portion 78 of the second track 20 until the anchor 28 reaches the second position.

With reference to block 720, the method 700 includes sliding the buckle 30 along the third track 22 from the first position to the second position. The vehicle computer 74 may send a signal to the motor 58 associated with the buckle 30 to slide the buckle 30 to the second position. The buckle 30 slides along the third track 22 until the buckle 30 reaches the second position. Blocks 710, 715, and 720 may all be executed by the vehicle computer 74 in any order and may executed simultaneously, i.e., at the same time.

With reference to decision block 725, the method 700 includes identifying certain vehicle impacts. The impact sensors 72 may communicate with the vehicle computer 74 to indicate whether a certain vehicle impact has occurred. If no certain vehicle impact is identified, the method 700 moves to decision block 735. If a certain vehicle impact is identified, the method 700 moves to block 730.

With reference to block 730, based on identification of a certain vehicle impact, the method 700 includes inflating the first airbag 62 and the second airbag 64 to the inflated positions. The vehicle computer 74 may send a signal to the inflator 68 to inflate the first airbag 62 and the second airbag 64 to the inflated position.

With reference to decision block 735, based on no certain vehicle impact being identified, the method 700 includes identifying the occupant of the wheelchair plans to exit the vehicle 10. The occupant may indicate that they occupant plans to exit in any suitable way, e.g., a push button, a sensor, a camera, etc. If no identification is made that the occupant plans to exit the vehicle 10, the block returns to decision block 725. If identification is made that the occupant plans to exit the vehicle 10, the method 700 moves to block 740.

With reference to block 740, based on identification of the occupant planning to exit the vehicle 10, the method 700 includes sliding the retractor 26 along the first track 18 from the second position to the first position. The vehicle computer 74 may send a signal to the motor 58 associated with the retractor 26 to slide the retractor 26 from the second position to the first position.

With reference to block 745, the method 700 includes sliding the anchor 28 along the second track 20 from the second position to the first position. The vehicle computer 74 may send a signal to the motor 58 associated with the anchor 28 to slide the anchor 28 to the first position. The anchor 28 slides along the first portion 78 of the second track 20 and the second portion 80 of the second track 20 until the anchor 28 reaches the first position.

With reference to block 750, the method 700 includes sliding the buckle 30 along the third track 22 from the second position to the first position. The vehicle computer 74 may send a signal to the motor 58 associated with the buckle 30 to slide the buckle 30 to the first position. The buckle 30 slides along the third track 22 until the buckle 30 reaches the first position. Blocks 740, 745, and 750 may all be executed by the vehicle computer 74 in any particular order and may executed at the same time. After the retractor 26, the anchor 28, and the buckle 30 have all reached the second positions, the method 700 ends.

The disclosure has been described in an illustrative manner, and it is to be understood that the terminology which has been used is intended to be in the nature of words of description rather than of limitation. The numerical adverbs "first," "second," and "third" are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
   a first post and a second post spaced cross-vehicle from the first post;
   a vehicle roof above the first post and the second post;
   a first track supported by the vehicle roof;
   a second track supported by the first post;
   a third track supported by the second post; and
   a seatbelt assembly including a retractor slidably engaged with the first track, an anchor slidably engaged with the second track, and a buckle slidably engaged with the third track.

2. The vehicle of claim 1, wherein the seatbelt assembly includes a seatbelt webbing extending from the retractor to the anchor.

3. The vehicle of claim 2, wherein the seatbelt webbing is dividable into a lap portion extending from the retractor to the buckle and a shoulder portion extending from the buckle to the anchor.

4. The vehicle of claim 3, further comprising a first airbag supported by the shoulder portion and a second airbag supported by the lap portion.

5. The vehicle of claim 2, further comprising an airbag supported by the seatbelt webbing.

6. The vehicle of claim 1, wherein the first post is vehicle-outboard of the second post.

7. The vehicle of claim 1, further comprising a wheelchair seating area between the first post and the second post.

8. The vehicle of claim 7, wherein the seatbelt assembly includes a seatbelt webbing engageable with the buckle in a belted position, the seatbelt webbing extending from the retractor to the buckle and from the buckle to the anchor in the belted position; and
   in the belted position, the retractor, the anchor, and the buckle are slidable along the first track, the second track, and the third track, respectively from a first position to a second position with the seatbelt webbing extending across the wheelchair seating area in the second position.

9. The vehicle of claim 8, wherein the retractor, the anchor, and the buckle are all in the first positions simultaneously and in the second positions simultaneously.

10. The vehicle of claim 7, wherein the wheelchair seating area is between the buckle and the anchor.

11. The vehicle of claim 1, further comprising a vehicle floor spaced downwardly from the vehicle floor, the first post and the second post each extending from the vehicle floor to the vehicle roof.

12. The vehicle of claim 1, wherein the retractor, the anchor, and the buckle are each slidable along the first track, the second track, and the third track, respectively, from a first position to a second position, the anchor and the buckle are spaced downwardly from the retractor in the second position.

13. The vehicle of claim 12, wherein the retractor and anchor slides relative to the first post from the first position to the second position and the buckle slides relative to the second post from the first position to the second position.

14. The vehicle of claim 1, wherein the first track is elongated along a vehicle-longitudinal axis and the second track includes a first portion elongated along the first post and a second portion elongated along the vehicle-longitudinal axis.

15. The vehicle of claim 14, wherein the first track and the second portion of the second track are elongated along the vehicle roof.

16. The vehicle of claim 1, wherein the first track extends from the first post to a distal end, the retractor being slidable between the distal end and the first post.

17. The vehicle of claim 1, further comprising a computer including a processor and a memory storing instructions executable by the processor to:
   identify a wheelchair in a wheelchair seating area;
   slide the retractor along the first track from a first position to a second position;
   slide the anchor along the second track from a first position to a second position; and
   slide the buckle along the third track from a first position to a second position.

18. The vehicle of claim 17, further comprising a wheelchair seating area between the first post and the second post; and
   wherein the seatbelt assembly includes a seatbelt webbing engageable with the buckle in a belted position, the seatbelt webbing extending from the retractor to the buckle and from the buckle to the anchor in the belted position; and
   in the belted position, the retractor, the anchor, and the buckle are slidable along the first track, the second track, and the third track, respectively from a first position to a second position with the seatbelt webbing extending across the wheelchair seating area in the second position.

* * * * *